Feb. 20, 1968  K. W. MARSHALL  3,369,286

TOOL FOR ASSEMBLING BUSHINGS

Filed Nov. 15, 1962  2 Sheets-Sheet 1

*INVENTOR.*
KEITH W. MARSHALL

BY *James A. Smith*

ATTORNEY

United States Patent Office 3,369,286
Patented Feb. 20, 1968

3,369,286
TOOL FOR ASSEMBLING BUSHINGS
Keith W. Marshall, Holgate, Ohio, assignor, by mesne assignments, to Clevite Corporation, a corporation of Ohio
Filed Nov. 15, 1962, Ser. No. 237,886
9 Claims. (Cl. 29—235)

This invention relates to tools for assembling bushings, and, more particularly, to an improved tool particularly useful for assembling resilient rubber bushings of the type comprising for example inner and outer metal sleeves between which a rubber sleeve is retained by elastic deformation and frictional bonding.

In fabrication of a bushing of the aforementioned type the rubber sleeve is molded to a tubular configuration having a central longitudinal bore smaller in diameter than the diameter of the inner metal sleeve. The rubber sleeve is initially assembled within the outer metal sleeve and then a tool is utilized to force the inner metal sleeve within the bore of the rubber sleeve to effect radial compression and longitudinal expansion of the rubber sleeve to establish frictional bonding of the engaging rubber and metal surfaces.

Assembly difficulty is commonly encountered in forcing the inner metal sleeve into position within the rubber sleeve. As the inner metal sleeve is driven into the rubber sleeve the leading edge of the metal interferes with the rubber material at the end of the bore often damaging the rubber part. While lubrication facilitates to some extent insertion of the inner metal sleeve the problem of starting the end of the metal sleeve has required the design of special tools and punches.

Tools are available which expand a rubber sleeve during assembly to establish a bore diameter thereof equal to the outside diameter of the metal sleeve. Such tools, however, consist of complicated mechanism and result in inefficient time consuming assembly operations which increase materially the assembly cost of the bushings.

A typical tool which has been used extensively consists of a support such as a table on which a sub-assembly of an outer metal sleeve and rubber sleeve is clamped preparatory to insertion of the inner metal sleeve. A punch in the form of an elongated shaft is generally aligned with the bore in the rubber sleeve and utilized to drive the inner metal sleeve in the bore upon downward movement of the punch, lubrication being provided to facilitate the operation. The punch is usually provided with a tapered head or drift behind which the inner sleeve is positioned to further facilitate, the insertion. The tapered head of the punch is generally provided with a maximum diameter approximately equal to the outside diameter of the inner sleeve to gradually expand the rubber sleeve bore during displacement of the punch to the outside diameter of the sleeve and to cause the leading edge of the inner sleeve to be carried into the bore with the punch without damage to the rubber material. In some tools the punch head is made expandable or collapsible to facilitate insertion of the inner sleeve of the punch and to facilitate withdrawal of the punch head from the bushing assembly after insertion of the inner sleeve.

While tools of the above-described type have been utilized with a fair degree of success it has been found that they possess several limitations particularly when utilized in automatic machinery for the mass assemblying of bushings and where assembly cost is a necessarily important factor. Automatic machinery has been devised for example which employs a rotating table carrying a number of bushing sub-assembly supports. An indexing means rotates the table in predetermined steps to sequentially bring the sub-assemblies in alignment with a punch which is actuated by an air or hydraulic cylinder to effect insertion of an inner metal sleeve in each sub-assembly when it is positioned in underlying aligned relationship with the punch. While sub-assemblies may be easily inserted in position as the table rotates the assembly speed is limited by the fact that an inner sleeve must be inserted on the punch after each operation before another sleeve insertion can be accomplished. Accordingly, the assembly rate for such equipment is dependent on the speed at which a sleeve can be inserted on the tool between operations thereof.

In addition to the insertion of a new sleeve on the punch between each operation the tapered head and sleeve must be lubricated prior to each tool operation to facilitate the sleeve insertion. This lubrication step in itself is time consuming and affects the punch operational speed and the assembly rate.

It is a principal object of this invention to provide an improved tool for force fitting inserts into a flexible part.

Another object of the invention is to provide an improved tool for assembling rubber bushings which lends itself to mass production techniques.

Still another object of the invention is to provide a tool for force fitting a rigid sleeve in a bore of a rubber sleeve wherein a drift is incorporated into a tool which also supports the sleeves to be assembled.

A further object of the invention is to provide a tool utilizing a reciprocating punch for force fitting a rigid sleeve in a flexible sleeve wherein neither sleeve is carried by the punch.

In general the invention contemplates the provision of a combined drift and sleeve supporting means to be positioned in underlying relationship with a reciprocal punch. The supporting means comprises a tubular post arranged to receive an inner metal sleeve on a lower portion thereof and a coaxial tubular member positioned above the post arranged to receive a rubber sleeve. The tubular member is carried on the end of a reciprocal shaft extending through the post. A plurality of flexible rods depend from the tubular member and are arranged to engage and be radially deflected by a surface on the post upon axial displacement of the shaft and tubular member to define a tapered surface substantially contiguous with the outer surface of the inner sleeve and the surface of the tubular member whereby a rubber sleeve on the tubular member may be expanded and forced over the inner metal sleeve by downward displacement of the punch.

Other objects and advantages will become apparent from the following description taken in connection with the accompanying drawings wherein.

Figure 1:
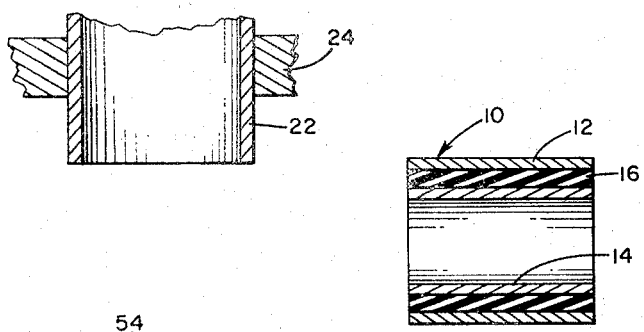
FIGURE 1 is a longitudinal sectional view of a rubber bushing assembly.

Referring to the drawings and particularly to FIGURE 1 there is shown a rubber bushing identified generally by the reference numeral 10 and comprising an outer metal sleeve 12, an inner metal sleeve 14 and a rubber insert sleeve 16. In assembly of the bushing 10 the rubber sleeve 16 is lubricated and inserted into outer sleeve 12 (by means not shown) to form the sub-assembly of the two parts illustrated in FIGURE 2. The lubrication utilized in assembly of the sub-combination is in time absorbed by the metal to result in a frictional bond of considerable strength between the outer sleeve 12 and rubber sleeve 16. The inner sleeve 14 is subsequently force fitted into the bore of the rubber sleeve 16 to radially compress the rubber material and effect longitudinal expansion of rubber sleeve 16 to result in the completed bushing assembly as illustrated in FIGURE 1. Bushing assemblies of the type illustrated in FIGURE 1 are well known to those skilled in the art and further description is deemed unnecessary.

Figure 2:
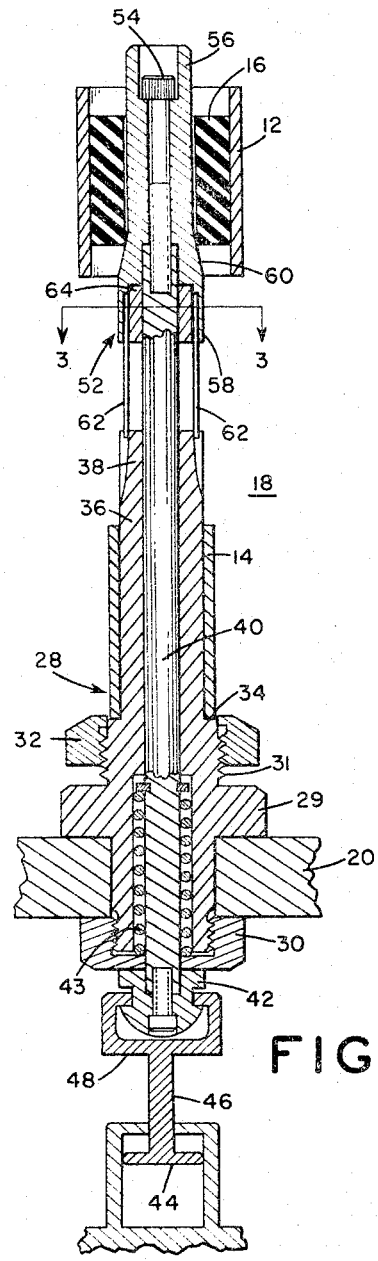
FIGURE 2 is a longitudinal sectional view of a tool embodying the invention and showing the parts to be assembled positioned thereon.

Referring now to FIGURE 2 of the drawings there is illustrated a tool identified generally by the reference numeral 18 for inserting, in the case of the bushing illustrated in FIGURE 1, the inner sleeve 14 within the longitudinal bore of rubber sleeve 16. As will be apparent from the ensuing description, however, the tool 18 is applicable to bushings of configuration other than that shown in FIGURE 1 and is generally applicable to accomplish force fitting of a rigid sleeve within a smaller diameter bore of a resilient part.

With specific reference to FIGURE 2 the tool 18 is mounted in a vertical position on a table or support 20 in coaxial relationship with a reciprocal punch 22 mounted for reciprocal axial movement in a suitable support 24. The table or support 20 may comprise a rotating table of an automatic assembly machine and may be rotated and indexed relative to punch 22 by suitable apparatus (not shown). For example, the table 20 may have mounted on a circle a plurality of tools 18 which may be sequentially positioned in aligned relationship with punch 22 by operation of the rotating and indexing apparatus (not shown) in timed relationship with operation of punch 22 and other operations to be hereinafter described.

The punch 22 is illustrated as comprising a tubular part corresponding in diameter to outer metal sleeve 12 and may be reciprocally actuated by a suitable air or hydraulic cylinder (not shown).

The tool 18 comprises in general a tubular post 28 having the lower end thereof extending through a bore in table 20 and having a supporting flange 29 seated on the upper surface of table 20. The post 28 is rigidly clamped to table 20 by a retaining cap 30 threaded on the lower end of post 28 in engagement with the underside of table 20.

The post 28 is of stepped diameter defining a lower threaded portion 31 above flange 29 on which is threaded an adjustable stop 32 adapted to be engaged by the end of the rubber sleeve 16 during the assembly process as will later be described. The post 28 defines an inner sleeve seating shoulder 34 and a smaller diameter longitudinal tapered upper end portion 38 of post 28. The end portion 36 is of uniform diameter and slightly smaller in diameter than the inner diameter of sleeve 14 to freely slidably receive the latter in engagement with shoulder 34 as illustrated in FIGURE 2. The portion 36 is of slightly greater length than sleeve 14 and is contiguous with a tapered upper end portion 38 of post 28. The end portion 38 tapers inwardly in diameter toward the upper end of post 28 for a functional purpose later to be described.

An elongated shaft 40 extends coaxially through a longitudinal bore of post 28 and cap 30 for reciprocal movement relative thereto. A stop and shaft actuator 42 is attached to the shaft 40 below the table 20 for engagement with the bottom surface of table 20 to provide a means for limiting upward axial movement of shaft 40, movement in the opposite direction being limited by means to be described. A spring 43 is mounted in compression between a spring retainer carried by shaft 40 and cap 30 to bias shaft 40 upward. Reciprocal axial displacement of shaft 40 may be effected by means of an air or hydraulically actuated piston 44 illustrated schematically below table 20. In an automatic multiple tool machine a single piston and cylinder assembly may be positioned as shown below table 20 and provided with a reciprocal piston rod 46 provided with an actuating yoke 48 having lugs arranged to be in engaging relationship with slots in the actuator 42 of each tool as it is positioned below punch 22 as illustrated in FIGURE 2 for tool 18. Thus a single actuator such as piston 44 may be arranged to serve a plurality of tools mounted on a rotatable table.

Carried on the upper end of reciprocal shaft 40 is a tubular member identified generally by the reference numeral 52. A bolt 54 having a head recessed in the upper end of member 52 extends through an axial bore of member 52 and is threaded in the upper end of shaft 40 to thereby rigidly retain member 52 for reciprocal axial movement with shaft 40.

Tubular member 52 in general comprises an upper tubular portion 56 having a uniform diameter corresponding to and slightly less than the bore diameter of rubber sleeve 16 to freely slidably receive the latter as depicted in FIGURE 2, a lower tubular portion 58 having approximately the same diameter as tubular portion 36 of post 28, and intermediate portion 60 tapered as shown between the diameters of tubular portions 56 and 58.

The structure of tool 18 as thus far described is such that the inner sleeve 14 may be inserted on the end of tubular member 52 and allowed to slide under the influence of gravity onto tubular portion 36 of post 28 in engagement with shoulder 34 as shown in FIGURE 2, whereupon the sub-assembly composed of outer sleeve 12 and rubber sleeve 16 may be inserted on tubular member 52 and subsequently forced downwardly by engagement of punch 22 with outer sleeve 12 to force inner sleeve 14 into the bore of rubber sleeve 16 assisted by the parts now to be described.

Figure 4:
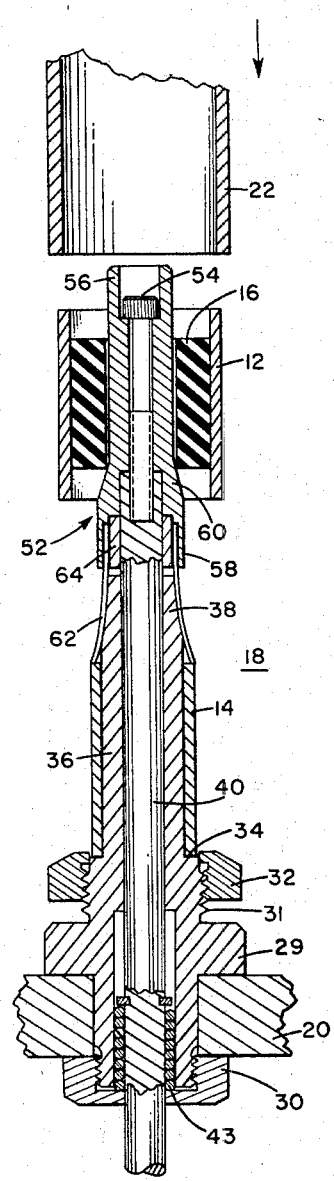
FIGURES 4, 5 and 6 are views similar to FIGURE 2 illustrating successive positions of the tool and bushing parts during assembly of the bushing.

Still referring to FIGURE 2 of the drawings there is provided a means effective in response to downward axial displacement of tubular member 52 from its upper position illustrated in FIGURE 2 to its lower position illustrated in FIGURE 4 to define a tapered surface substantially contiguous with the surface of tubular portion 58 and the outer surface of sleeve 14 whereby the sub-assembly comprising outer sleeve 12 and rubber sleeve 16 may be readily forced over the sleeve 14 without interference of the upper edge of sleeve 14 with the rubber material. This means comprises a plurality of close radially spaced flexible rods 62 depending from the lower end of tubular member 52 to substantially define a cylindrical surface in the upper position of tubular member 54 shown in FIGURE 2 but arranged to be radially expanded in the lower position of tubular member 52 by engagement with the tapered surface of portion 38.

Figure 3:
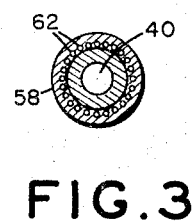
FIGURE 3 is a section taken along the line 3—3 of FIGURE 2.

Specifically, the upper ends of rods 62 are positioned within a cylindrical cavity in the lower end of tubular member 52 and securely clamped against the cavity wall by means of an annular retaining ring 64 force fitted within said cavity, the retaining ring 64 being engageable with the upper end of post 28 to limit downward movement of tubular member 52 as will be apparent from FIGURE 4. The rods 62 are thus mounted in a circle as shown most clearly in FIGURE 3, in the lower end of tubular member 58 and extend downwardly in the free state thereof as shown in FIGURE 2 in closely spaced parallel relationship to effectively define a cylindrical surface. The mounting diameter of rods 62 is such in relation to the end diameter of tapered portion 38 of post 28 to cause the lower free ends of the rods in the free state thereof to fit slightly over the end of tapered portion 38 as depicted in FIGURE 2. This slightly overlapping relationship of the rod ends with the end of tapered portion 38 may be achieved through adjustment of nut 42 to adjust the upper position of tubular member 52.

Upon downward displacement of tubular member 52 the rods 62 will be deflected radially outward by the tapered surface of portion 38 causing cantilever bending of each rod 62 relative to its fixed end, the extent of radial deflection progressively increasing with downward displacement of tubular member 52. In the lowermost position of tubular member 52 illustrated in FIGURE 4 the rods 62 will engage the tapered surface of portion 38 substantially over the length of the latter and will have their lower ends adjacent the end of sleeve 14. In this lower position the outermost edges of the rod ends define a diameter slightly larger than the outer diameter of sleeve 14. The rods 62 accordingly function in the expanded condition thereof to define a tapered surface substantially contiguous with the surface of end portion 38 of tubular member 52 and substantially contiguous with the surface of sleeve 14 whereby the rubber sleeve 16 may be forced downward over tubular member 52 and post 28 onto sleeve 14 into engagement with stop 32 as will now be described.

In operation of the tool 18 assume that table 20 is positioned as shown in FIGURE 2 with tool 18 aligned with punch 22 and lug 48 positioned in the slot of shaft 40. Punch 22, tubular member 52 and shaft 40 will be in their uppermost positions with rods 62 in their straight condition as shown in FIGURE 2. The sleeve 14 is first inserted over the upper end of tubular member 52 and allowed to slide downward under the influence of gravity onto the post portion 36 into engagement with shoulder 34. The next step is to position the sub-assembly of outer sleeve 12 and rubber sleeve 16 on the tubular end portion 56 as shown in FIGURE 2.

With the sub-assembly and inner sleeve positioned as illustrated in FIGURE 2, the shaft 40 is actuated downwardly against the bias of spring 43 causing the rods 62 to be flexed radially outward by engagement with the tapered surface of post portion 38. When the retaining ring 64 engages the upper end of post 28 the tubular member 52 will come to rest with rods 62 in their fully expanded condition to define a tapered surface between end portion 58 and the surface of sleeve 14 as illustrated in FIGURE 4.

With rods 62 expanded as shown in FIGURE 4 punch 22 is displaced downward as also indicated in FIGURE 4 to engage the outer metal sleeve 12 to drive the bushing sub-assembly downward toward inner sleeve 14.

Figure 5:
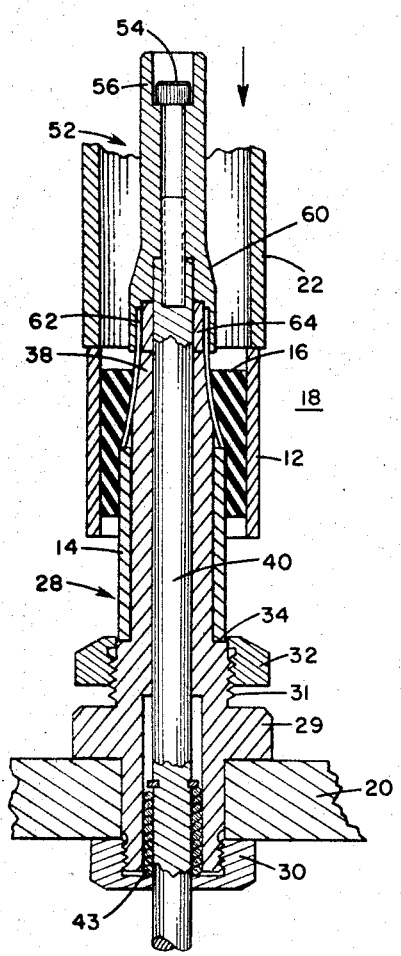

Some preliminary or initial expansion of the bore of sleeve 16 will occur as the sub-assembly is forced downward over tapered portion 60 and onto end portion 58 of tubular member 52. Further downward displacement of the sub-assembly by operation of punch 22 will cause the rubber sleeve 16 to be further expanded over the tapered surface established by rods 62 and to be forced over the end of sleeve 14 as illustrated in FIGURE 5. As the rubber material is radially compressed longitudinal expansion occurs simultaneously causing the sleeve 16 to increase in length as is apparent from FIGURE 5.

Figure 6:
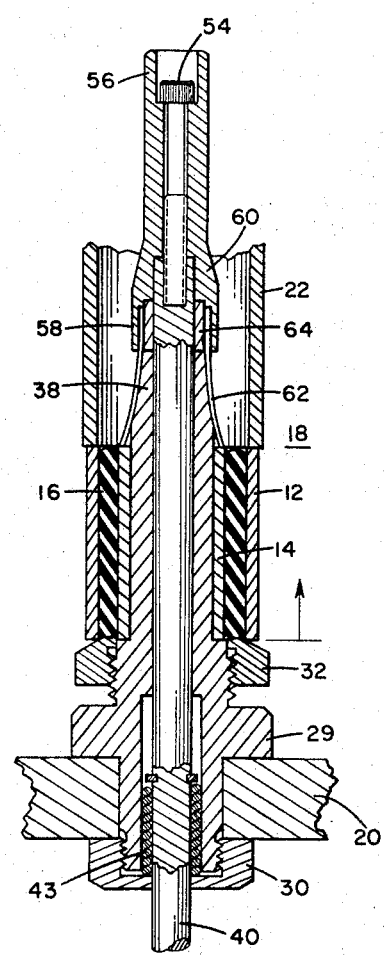

In FIGURE 6 of the drawings the punch 22 has been illustrated in its lowermost position with the sleeve 14 completely inserted in the rubber sleeve 16 and the assembly of the bushing thus complete. To remove the completed bushing assembly punch 22 is returned to its vertical position and shaft 40 is actuated to return tubular member 52 to its upper position whereupon the bushing assembly 10 can be readily removed from the tool.

It will be apparent that if a bushing is assembled which does not employ an outer metal sleeve, the rubber sleeve being in such case the outer part, the punch 22 will be caused to directly engage the end of the rubber sleeve.

Preferably prior to the assembly process described the sleeve 14 and surfaces of the tool 18 frictionally engaged by the rubber part are coated with lubricant to facilitate the assembly operation. During lubrication a certain amount of lubricant is trapped between the wires 62 to augment lubrication of the rubber sleeve 16 as it passes over the wires.

One of the most important features of the invention is the incorporation of a drift (rods 62 and tapered surface of portion 38) on a relatively fixed tool which also supports the bushing parts to be assembled thus avoiding the necessity of an operator handling the tool or punch. The invention thus results in a tool which lends itself to use with high speed mass production assembly equipment.

In the case of a multiple tool machine utilizing an indexed table the parts to be assembled can be inserted on the tools by an operator as they approach the punch and the completed bushings similarly removed after the tools have passed the punch permitting the punch to be operated at high speed without operation of the punch being interrupted for insertion or removal of bushing parts to be assembled.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A tool for force fitting a rigid sleeve into a smaller diameter bore of a rubber part comprising: a support; a tubular post extending upward from said support; said tubular post defining a lower tubular portion adapted to slidably receive thereon the rigid sleeve and defining an upper tubular portion adapted to slidably receive thereon the rubber part and to hold them in axially spaced-apart relation to each other; a reciprocal punch mounted above said post in axial alignment therewith for forcing the rubber part down said post onto said sleeve to forcibly insert said sleeve into the bore of the rubber part; flexible means on said post between said upper and lower portions thereof defining a radially expandible surface; means forming part of said post for causing said post to foreshorten, and means for actuating said means to expand said surface to define a tapered surface and to foreshorten said post to facilitate downward movement of the rubber part onto said sleeve.

2. A tool as claimed in claim 1 wherein the flexible means comprises a plurality of flexible rods extending downward from said upper tubular portion in parallel axial relationship therewith and having the upper ends thereof fixedly mounted on a circle on said upper tubular portion, said actuating means being effective to cause outward radial deflection of the lower ends of said rods to define said tapered surface.

3. A tool for force fitting a rigid sleeve into a smaller diameter bore of a rubber part comprising: a support; a first tubular member mounted on said support and extending upwardly therefrom, said first tubular member having a diameter corresponding to the inner diameter of the sleeve to freely slidably receive the sleeve thereon; a second tubular member positioned above said first tubular member in spaced coaxial relationship therewith having a maximum diameter such as to permit free sliding movement of the rigid sleeve over the same onto said second tubular member and having at least the upper end portion thereof of smaller diameter corresponding to the bore diameter of the rubber part to freely slidably receive thereon the rubber part and to hold them in axially spaced-apart relation to each other; means for displacing said second tubular member axially between upper and lower positions relative to said first tubular member; radially expandible means mounted on one of said members defining a cylindrical surface between said members in said upper position of said second tubular member of effective diameter less than the inner diameter of the sleeve; and means responsive to displacement of said second tubular member from said upper to said lower position thereof to effect radial expansion of said means to define a tapered longitudinal surface contiguous with the surface of said second member and the outer surface of the sleeve when the latter is positioned on said first member whereby the rubber part when received on said upper portion of said second member may be forced downwardly by an axial force over said tapered surface onto the sleeve to forcibly receive the latter within the bore thereof.

4. A tool for force fitting a rigid sleeve within a smaller diameter resilient sleeve comprising: a support; a tubular post mounted on said support and extending upwardly therefrom, said post having a diameter corresponding to the inner diameter of the rigid sleeve to freely slidably receive the rigid sleeve thereon; a tubular member positioned above said post in spaced coaxial relationship therewith; said tubular member having a maximum diameter such as to permit free sliding movement of the rigid sleeve over the same onto said post and having at least the upper end portion thereof of smaller diameter to freely slidably receive thereon the resilient sleeve and to hold said sleeves in axially spaced-apart relation to each other; means for axially displacing said tubular member between upper and lower positions relative to said post; flexible means extending from the lower end of said tubular member permitting free sliding movement of the sleeve down said tubular member onto said post in said upper position of said member; and means responsive to displacement of said tubular member from said upper to said lower position thereof to effect outward radial flexing of said flexible means to define a tapered longitudinal surface substantially contiguous with the surface of said tubular member and the outer surface of the sleeve when the latter is positioned on said post whereby the resilient sleeve when received on said upper portion of said tubular member may be forced downwardly by an axial force over said tapered surface defined by said flexible means and over the rigid sleeve to force fit the latter with the bore of the resilient sleeve.

5. A tool as claimed in claim 2 wherein said post is provided with a surface at the upper end thereof progressively tapering inwardly in diameter toward said upper end; and said plurality of flexible rods are closely radially spaced and extend downwardly from the lower end of said tubular member and have free ends adjacent said tapered surface in said upper position of said tubular member, said rods being adapted to engage said tapered surface upon downward displacement of said tubular member to said lower position thereof to effect outward radial cantilever deflection of said rods relative to said tubular member.

6. A tool for force fitting a metal sleeve within a smaller diameter bore of a rubber sleeve comprising: a support; a tubular post mounted on said support and extending upwardly therefrom, said post having a diameter corresponding to the inner diameter of the metal sleeve to freely slidably receive the sleeve thereon and having a surface tapering inwardly in diameter toward the upper end of said post; an elongated reciprocal shaft extending through said post in coaxial relationship therewith; a tubular member mounted on the end of said shaft above said post in coaxial spaced relationship with said post for reciprocal movement on said shaft between upper and lower vertical positions; said tubular member having a maximum diameter such as to permit free sliding movement of the metal sleeve down the same onto said post and having at least the upper end portion thereof of diameter to freely slidably receive the rubber sleeve for holding said sleeves in axially spaced-apart relation to each other; flexible means depending from the lower end of said tubular member positioned to engage said tapered surface upon axial displacement of said tubular member from said upper to said lower position upon actuation of said shaft to effect radial deflection of said means to define a tapered longitudinal surface substantially contiguous with the outer surface of the sleeve when the latter is received on said post and substantially contiguous with the lower surface of said tubular member; a punch positioned above said tubular member for forcing the rubber sleeve when positioned on said tubular member downward over said tapered surface defined by said flexible means and over said metal sleeve to forcibly insert the metal sleeve within the bore of the rubber sleeve.

7. A tool as claimed in claim 6 wherein said flexible means comprises a plurality of radially spaced flexible rods.

8. A tool for force fitting a rigid sleeve within a smaller diameter bore of a flexible sleeve comprising: a tubular part having a diameter corresponding to the inner diameter of the rigid sleeve to freely slidably receive the rigid sleeve thereon; a shoulder at one end of said part providing a seating surface for the sleeve; a surface at the other end of said part tapering inwardly in diameter toward said other end; means supported on said part for reciprocal movement relative thereto and defining a tubular member positioned coaxially with and adjacent said tapered surface to define a tubular extension of said tubular part; said tubular member of said reciprocal means being positioned axially toward and away from said tapered surface in response to reciprocal movement of said means; said tubular member having a maximum diameter permitting free sliding movement of the rigid sleeve over the same onto first tubular part and a diameter at the end thereof opposite from said tapered surface to freely slidably receive thereon the flexible sleeve for holding said sleeves in axially spaced-apart relation to each other; flexible means extending from said tubular member toward said tapered surface for engagement therewith upon axial displacement of said tubular member toward said tapered surface to be radially expanded to define a surface substantially contiguous with the surface of said tubular member and the surface of the rigid sleeve positioned on said tubular part to permit the resilient sleeve to be radially expanded and forced downward onto the rigid sleeve.

9. A tool as claimed in claim 8 wherein said flexible means comprises a plurality of radially spaced flexible rods.

References Cited
UNITED STATES PATENTS

| | | | |
|---|---|---|---|
| 2,550,564 | 4/1951 | Hutton | 29—235 |
| 2,660,780 | 12/1953 | Beck | 29—235 |
| 2,830,361 | 4/1958 | Bruner | 29—235 |
| 2,947,070 | 8/1960 | Peppercorn | 29—235 |

OTHELL M. SIMPSON, *Primary Examiner.*

MILTON S. MEHR, *Examiner.*

J. C. PETERS, *Assistant Examiner.*